No. 737,599. PATENTED SEPT. 1, 1903.
J. H. EVANS.
END CLIP OR BEARING PLATE FOR SEMIELLIPTIC SPRINGS.
APPLICATION FILED JULY 22, 1903.
NO MODEL.
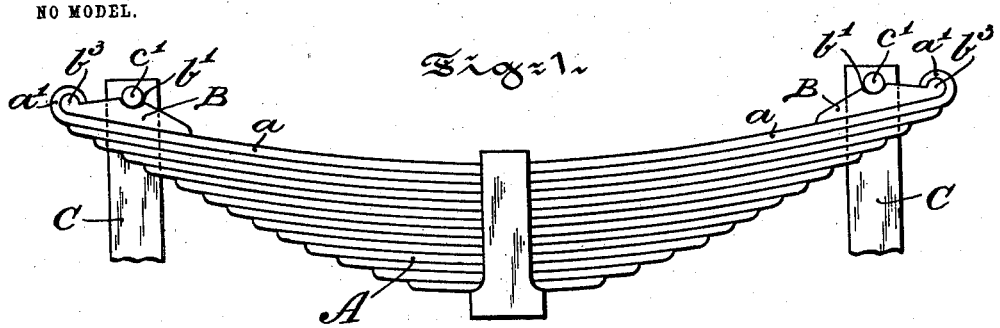
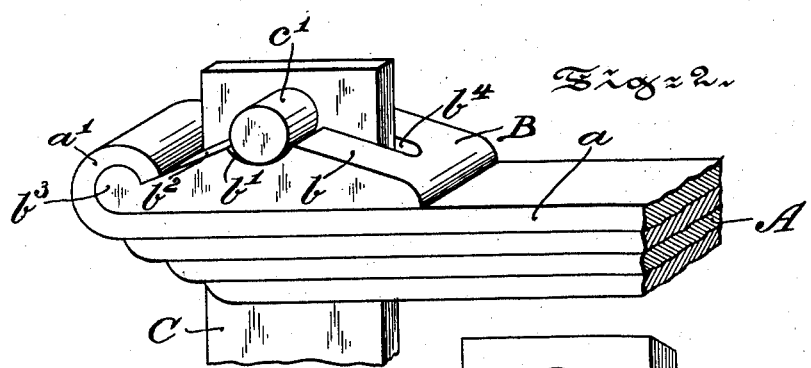
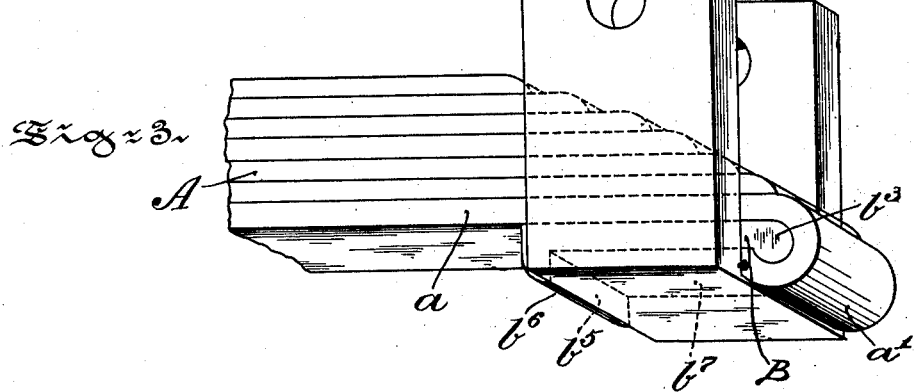
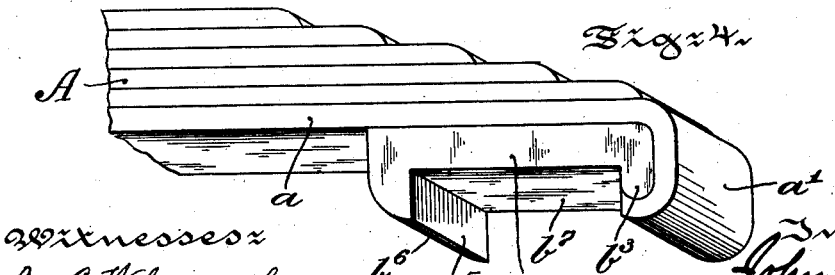
Witnesses:
Jas. C. Wobmsmith.
Wilhelm Vogt.
Inventor:
John H. Evans,
By J. Walter Douglas
Attorney No. 737,599.

Patented September 1, 1903.

UNITED STATES PATENT OFFICE.

JOHN H. EVANS, OF OAK LANE, PENNSYLVANIA, ASSIGNOR TO HIMSELF, WILLIAM EVANS, AND ROBERT EVANS, TRADING AS JOHN EVANS' SONS, OF PHILADELPHIA, PENNSYLVANIA.

END CLIP OR BEARING-PLATE FOR SEMIELLIPTIC SPRINGS.

SPECIFICATION forming part of Letters Patent No. 737,599, dated September 1, 1903.

Application filed July 22, 1903. Serial No. 166,508. (No model.)

*To all whom it may concern:*

Be it known that I, JOHN H. EVANS, a citizen of the United States, residing at Oak Lane, in the county of Philadelphia and State of Pennsylvania, have invented certain new and useful Improvements in End Clips or Bearing-Plates for Semielliptic Springs, of which the following is a specification.

My invention has relation to semielliptic springs in conjunction with end clips or bearing-plates adapted to detachably fit the ends of such semielliptic springs for locomotives, tenders, &c., on which the load is usually supported; and in such connection it relates to the construction of the springs and arrangement of the end clips or bearing-plates for such semielliptic springs for locomotives and tenders, as well as other somewhat similar types of springs to which such clips or bearing-plates are equally applicable, the clips or bearing-plates being so arranged as to be readily applied to and detached from the ends of the springs and the ends of the springs and plates provided with mechanical means adapted to sustain or support the load.

The nature and scope of my present invention will be more fully understood from the following description, taken in connection with the accompanying drawings, forming part hereof, in which—

Figure 1 is a side elevational view of a semielliptic spring with detachable end clips or bearing-plates of my invention shown in application to the respective ends of the uppermost leaf of the spring. Fig. 2 is a perspective view, in broken section, of one end portion of a semielliptic locomotive-spring, showing the slotted clip or bearing-plate mounted on the uppermost leaf of the spring in locking engagement with the spring, and a hanger extending through the slot of said clip and leaves of the spring, and a pin arranged transversely of the hanger and in engagement with a recess in the shouldered portion of the clip in its locked position. Fig. 3 is a similar view of a modified form of a tender-spring, showing the recessed and shouldered end clip or bearing-plate in engagement with the lowermost leaf of the spring and with a saddle-hanger adapted to span the end of the spring and clip for supporting the same in required position to sustain the load; and Fig. 4 is a similar view of a slightly-modified form of the end of a tender-spring and detachable clip or bearing-plate in engagement with such a locomotive-tender spring and adapted to be spanned by a saddle-hanger of the same type as illustrated in Fig. 3 or of any other suitable type.

Referring to the drawings, A represents a semielliptic spring of which the various leaves are locked together by means of a band in any suitable manner.

$a$ in Figs. 1 and 2 is the uppermost leaf of the spring, and in Figs. 3 and 4 $a$ represents the lowermost leaf thereof. The main leaf $a$ is curved over or made in the form of a gooseneck at each end, as at $a'$.

B in Figs. 1 and 2 is the end clip or bearing-plate with a flat base, and which clip or plate is made tapering, as at $b$, to a recess $b'$ and tapers therefrom, as at $b^2$, to a rounded end $b^3$, which corresponds in shape to the gooseneck or turned-over end $a'$ of the leaf $a$ of the spring A in order that the clip or plate B may be readily slid sidewise to place into the end of the leaf $a$ of the spring A and be held to place thereby on said spring. The clip or plate B is slotted, as at $b^4$, through the body thereof, and this slot extends, preferably, through certain of the leaves of the spring A, so that a hanger or strap C may be inserted carrying a pin $c'$, adapted to engage in the recess $b'$ of the inclined shouldered clip or plate B. The clip or plate is made preferably of malleable or wrought iron, or it may be made of any other preferred material. It can be economically made and readily applied to a spring, as well as readily detached therefrom, when the dead-load on the spring is released or lessened in case of repairs without injuring any parts by resort to tools, so that neither end clips or plates or leaves of the spring can be impaired by the assembling or separating of the parts of the spring, thereby especially adapting the clips or plates for use in semielliptic or similar types of springs used in locomotives and tenders of motive-power appliances.

In Figs. 3 and 4 is shown a spring having the turned-over or gooseneck ends $a'$, shown formed at the respective ends of the lowermost leaf of the series of leaves of the spring, in which the clip or plate B is shouldered or rounded at $b^3$ at one end, so as to correspond in shape with and to fit the space formed by the gooseneck or turned-over end $a'$ of the leaf $a$ of the spring A, and the clip or plate B has a flat face $b^7$ and at the opposite end is provided a projection $b^5$ with a round tapering surface $b^6$, to the base of the clip or plate B. The same is true of the clip of Fig. 4, except that the rounded end $b^3$ at the right of the clip or plate B is slightly modified in shape, so as to correspond with the particular shape of the curved end $a'$ of the leaf $a$ of the spring A.

Having thus described the nature and objects of my invention, what I claim as new, and desire to secure by Letters Patent, is—

1. A spring provided with leaves, whereof one has gooseneck shape or turned-over ends, in combination with a clip or plate detachably fitting each of said ends and supported on said leaf, and means for supporting said spring and clip or plate.

2. A spring provided with leaves, whereof one leaf is provided with gooseneck shape or turned-over ends, in combination with a clip or plate detachably fitted sidewise into each of said ends and supported in position on the surface of said leaf, and means for supporting said spring and clip or plate in required load-carrying position.

3. A spring provided with leaves, whereof one of said leaves has turned-over ends, in combination with a complemental clip or bearing-plate at each end resting thereon and in engagement with said ends, and means extending through the body of said clip or plate and spring and having a device adapted to engage with said clip or plate.

4. A spring provided with leaves, whereof one has turned-over ends, in combination with a clip or plate with a complemental end adapted to be slid into contact with each end of said spring and bear upon the surface thereof, and means for supporting said spring and clip or plate in required operative or load-carrying position.

5. A spring provided with leaves, whereof one has a turned-over or curved end, in combination with a clip or plate provided with a complemental end and opposite shouldered end and a saddle-shaped hanger adapted to support said clip or plate and spring in required position.

6. A spring provided with a turned-over or curved end, in combination with a clip or plate having a complemental shaped end and recess shouldered body having a slot extending therethrough and said spring and a hanger or strap with a pin engaging said slot and recess of the shouldered body of said clip or plate.

In testimony whereof I have hereunto set my signature in the presence of two subscribing witnesses.

JOHN H. EVANS.

Witnesses:
J. WALTER DOUGLASS,
THOMAS M. SMITH.